Patented Jan. 18, 1927.

1,614,521

UNITED STATES PATENT OFFICE.

GUY H. BUCHANAN, OF WESTFIELD, AND PALMER W. GRIFFITH, OF ELIZABETH, NEW JERSEY, ASSIGNORS TO AMERICAN CYANAMID COMPANY, OF NEW YORK, N. Y., A CORPORATION OF MAINE.

PROCESS OF MAKING A NITROGENOUS FERTILIZER MATERIAL.

No Drawing.     Application filed February 8, 1924.    Serial No. 691,480.

This invention relates to a nitrogenous fertilizer material and process of producing the same, and has for its object to produce an article of this kind more expeditiously and at a less cost than has been heretofore proposed.

With these and other objects in view, the invention consists in the novel steps and combinations of steps constituting the process, and in the novel product, all as will be more fully hereinafter disclosed and particularly pointed out in the claims.

In order that the invention may be the more clearly understood, it is said: In the prior U. S. Patent #1,355,369, for nitrogenous phosphatic material and process of producing the same, issued to Frank S. Washburn, on October 12, 1920, there is disclosed a nitrogenous phosphatic product made from crude calcium cyanamid and phosphoric acid. This said Washburn invention has the advantages of yielding a material containing high percentages of ammonia and phosphoric acid, and it permits a variation of the relative proportions of these two plant foods within comparatively wide limits. But the process of this said patent has the disadvantage that complex ureas are formed during the operation, consisting of basic materials which consume a portion of the phosphoric acid used in treating the lime nitrogen extract.

In the present invention, this disadvantage is obviated in that it involves a method whereby the phosphoric or mineral acid employed is used not only for the purpose of converting the cyanamid into urea itself, but also for the fixation of a further quantity of plant food in the form of ammonia. That is to say, our process produces a urea compound which does not require an acid to fix it, all as will presently appear.

Therefore, in carrying out this present invention one may prepare a solution of cyanamid $H_2CN_2$ preferably by a method described in a copending application of even date herewith filed by George Barsky and Palmer W. Griffith, (one of the co-inventors of this process) and entitled Process of producing cyanamid.

In the said Barsky and Griffith application just referred to a solution of crude calcium cyanamid is treated with an acid so that its hydrogen ion concentration lies between $10^{-8}$ normal and $10^{-2}$ normal, whereupon the solution may be filtered, and a substantially pure solution of $H_2CN_2$ is had. To such a solution of cyanamid, in carrying out the present invention we add an acid such as sulphuric acid or phosphoric acid. We then heat this acidified solution preferably at a temperature below 60° C. until substantially all the cyanamid present is converted into urea. When the transformation of the cyanamid to urea is thus substantially completed, we neutralize the acid present in the solution with ammonia. We then evaporate the solution in vacuo and finally to dryness preferably by means of a spray dryer, but of course we may, if desired, partially evaporate the solution before neutralization of the acid.

By proceeding in this manner, we avoid the formation of compounds which require acid to fix them, because we do not produce any of the above mentioned objectionable basic materials. We are thus enabled by means of our process to utilize in two ways whatever acid we may employ in the transformation of the cyanamid into urea. That is, we may utilize said acid to convert the cyanamid into urea, and we may also subsequently utilize said acid to fix ammonia in the urea mixture as an additional plant food, a result never heretofore attained, in so far as we are aware.

In practice, when using phosphoric acid we prefer to so proportion our lime nitrogen extract produced as above disclosed to the phosphoric acid as to obtain a mixture containing approximately equal parts of nitrogen, and phosphorus pentoxide $P_2O_2$. In case we desire to produce a nitrogenous phosphatic material that contains a larger percentage of phosphoric acid, it is only necessary to use an excess of phosphoric acid over that required to transform the cyanamid into urea and in a quantity sufficient to supply the desired larger percentage of combined phosphorous, and then to neutralize this excess of phosphoric acid with ammonia.

In case it is preferred to use an acid other than phosphoric acid, such for example as sulphuric acid, for the treatment of the lime nitrogen extract, one may proportion the quantity of acid used according to the nature of the product it is wished to produce.

Thus, if one desires to produce a material containing most of its nitrogen in the form of urea, he would use only sufficient sulphuric acid to cause the transformation of the cyanamid $H_2CN_2$ into urea, to take place, and the ammonia he uses for neutralizing the acid will be small in quantity. On the other hand, if one desired to produce a material containing substantial quantities of both urea nitrogen and ammonia nitrogen, he would proportion the amount of lime nitrogen extract and acid in such a way that an excess of acid exists. The neutralization of this excess of acid with ammonia will then introduce into the plant food the desired quantity of ammonia nitrogen.

It can be readly seen that one may widely vary the percentages of urea nitrogen and of ammonia nitrogen, or of urea nitrogen, ammonia nitrogen, and phosphorus pentoxide in the manner just disclosed. That is to say, by varying the proportions of lime nitrogen extract and the particular acid used, one may in this way really necessitate the addition of greater or less quantities of ammonia to the solution in order to neutralize the acid present, and thus add additional fixed nitrogen to the product. In fact, we have found it is possible by this method to produce mixtures containing from 20% to 45% nitrogen and from 45% to 5% $P_2O_5$.

It is obvious that those skilled in the art may vary the details of the procedure without departing from the spirit of the invention, and therefore it is not desired to be limited to the foregoing disclosure except as may be required by the claims.

What is claimed is:

1. The process of preparing a nitrogenous plant food material which consists in treating calcium cyanamide to produce a solution of free cyanamide, treating the same with an acid, heating said acid mixture and substantially neutralizing said acid mixture with ammonia.

2. The process of preparing a nitrogenous plant food material which consists in treating calcium cyanamide to produce a solution of free cyanamide, removing calcium compounds therefrom, treating the same with an acid, heating said acid mixture and substantially neutralizing said acid mixture with ammonia.

3. The process of preparing a nitrogenous plant food material which consists in treating calcium cyanamide to produce a solution of free cyanamide, removing calcium compounds therefrom, treating the same with phosphoric acid, heating said acid mixture and substantially neutralizing said acid mixture with ammonia.

4. The process of preparing a nitrogenous plant food material which consists in treating calcium cyanamide to produce a solution of free cyanamide, removing calcium compounds therefrom, treating the same with an amount of phosphoric acid in excess of that required to convert substantially all of the cyanamide to urea, heating said acid mixture and substantially neutralizing said acid mixture with ammonia.

In testimony whereof we affix our signatures.

GUY H. BUCHANAN.
PALMER W. GRIFFITH.